United States Patent
Wu

(10) Patent No.: US 6,409,109 B1
(45) Date of Patent: Jun. 25, 2002

(54) PEPPER GRINDING TOOL

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/468,942

(22) Filed: Dec. 22, 1999

(51) Int. Cl.[7] ................................................ A47J 42/04
(52) U.S. Cl. ..................................... 241/169.1; 241/168
(58) Field of Search ............................ 241/169.1, 168

(56) References Cited

U.S. PATENT DOCUMENTS

| | | | | |
|---|---|---|---|---|
| 4,685,627 A | * | 8/1987 | Lee ........................... | 241/169.1 |
| 4,865,258 A | * | 9/1989 | Smith et al. .............. | 241/169.1 |
| 5,007,592 A | * | 4/1991 | Poncy ...................... | 241/169.1 |
| 5,052,631 A | * | 10/1991 | Poncy ...................... | 241/169.1 |
| 5,180,114 A | * | 1/1993 | Chen ........................ | 241/169.1 |
| 5,722,606 A | * | 3/1998 | Wu ........................... | 241/169.1 |
| 5,897,067 A | * | 4/1999 | Tardif et al. ............. | 241/169.1 |
| 6,224,005 B1 | * | 5/2001 | Wu ........................... | 241/169.1 |

* cited by examiner

Primary Examiner—Allen Ostrager
Assistant Examiner—William Hong
(74) Attorney, Agent, or Firm—Rosenberg, Klein & Lee

(57) ABSTRACT

A pepper grinding tool comprises a main body, a socket, a grinding member and a transmission shaft. The socket is received in the main body, and has a rim fitted onto an annular recess in the main body. The grinding member has an outer grinding part and an inner grinding part received in the outer part can be turned for grinding pepper between the inner and the outer grinding parts. The outer grinding part also has a rim; the rim is located under the rim of the socket. Screws are screwed through the rims and into the main body to secure the outer grinding part to the main body. The shaft is connected to the inner grinding part from a lower end, and passed through an upper cover of the pepper grinding tool. Thus, pepper particulate can be dispensed from a bottom of the grinding member very easily without any residue because no any fixing element is arranged under the grinding member to block the exit of the pepper grinding tool.

3 Claims, 6 Drawing Sheets

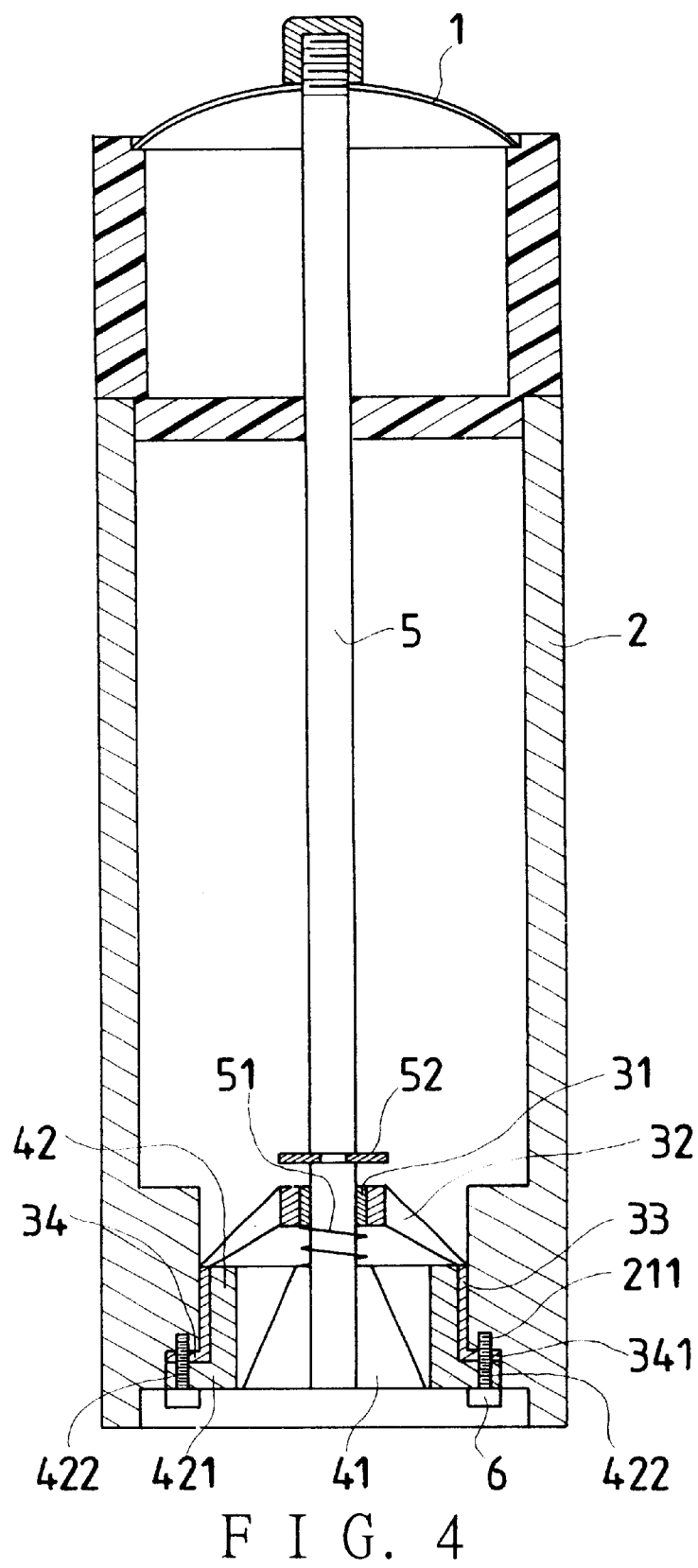
F I G. 4

PEPPER GRINDING TOOL

BACKGROUND OF THE INVENTION

The present invention relates to a pepper grinding tool, and particularly to one of which the grinding assembly is fitted to the main housing body thereof such that the ground pepper particulate can be easily and completely dispensed therefrom without any residue.

Referring to FIG. 5, a heretofore known pepper grinding tool comprises an upper cover 10, a main body 20, a grinding member 30 and a fixing plate 40. The main body 20 is transparent.

The main body 20 has a holding room therein, and connecting parts 201.

The grinding member 30 is received in the holding room of the main body 20. The grinding member 30 includes an outer grinding part 302, an inner grinding part 301 and a transmission shaft 303. The inner grinding part 301 received in the outer grinding part 302 can be turned for permitting pepper to be ground therebetween. The transmission shaft 303 is passed through the outer grinding part 302 and connected to the inner grinding part 301 from a lower end portion thereof The transmission shaft 303 is connected to the upper cover 10, which can be turned manually, and a nut 101 from an upper end thereof.

The outer grinding part 302 has a lower rim 304 and gaps 305 provided for the grinding member 30 to be connected to the connecting parts 201.

The fixing plate 40 has two bent parts 403 and screw holes 401 at two end portions thereof In combination, the fixing plate 40 is connected to the outer grinding part 302 with the bent parts 403 each engaging a respective one of the gaps 305. Screws 402 are screwed into the screw holes 401 of the fixing plate 40 and the connecting parts 201 of the main body 20.

The pepper grinding tool can grind pepper into small particulate and dispense same to the food from a bottom of the grinding member 30. However, some of the pepper particulate will be stopped from falling down by the fixing plate 40, i.e. some of the particulate will rest on the fixing plate 40 unless the pepper grinding tool is shaken. These pepper residues will fall down and dirty the table or the ground when the pepper grinding tool is passed around.

SUMMARY OF THE INVENTION

Therefore, it is a main object of the present invention to provide a pepper grinding tool, of which the pepper grinding member is fitted to the main body thereof in a way, that the ground pepper particulate can be dispensed completely without residues.

The main body has a holding chamber therein, and an annular recess on an inner side thereof A socket is received in the holding chamber. The socket has a rim fitted onto the annular recess.

The grinding member has an outer grinding part and an inner grinding part; the inner grinding part received in the outer part is able to be turned such that pepper can be ground into small particulate between same and the outer part. The outer part is received in the socket, and has a rim located under the rim of the socket. Screws are screwed through the rims, and into the inner side of the main body to secure the outer grinding part and the socket to the main body.

A transmission shaft is passed through the socket and the outer grinding part, and is connected to the inner grinding part from a lower end. The upper end of the shaft is passed through an upper cover of the main body.

Because there is no any fixing element arranged under the bottom of the grinding member where the ground particulate are dispensed, the particulate can fall out of the grinding member easily and completely without having to shake the pepper grinding tool. When the pepper grinding tool is passed around in the room or on the table, there is no pepper residence that will dirty the room or the table.

BRIEF DESCRIPTION OF THE DRAWINGS

The present invention will be better understood by reference to the accompanying drawings, wherein:

FIG. 4 is a cross-sectional view of the pepper grinding tool in FIG. 3.

DESCRIPTION OF THE PREFERRED EMBODIMENTS

Figure 1:
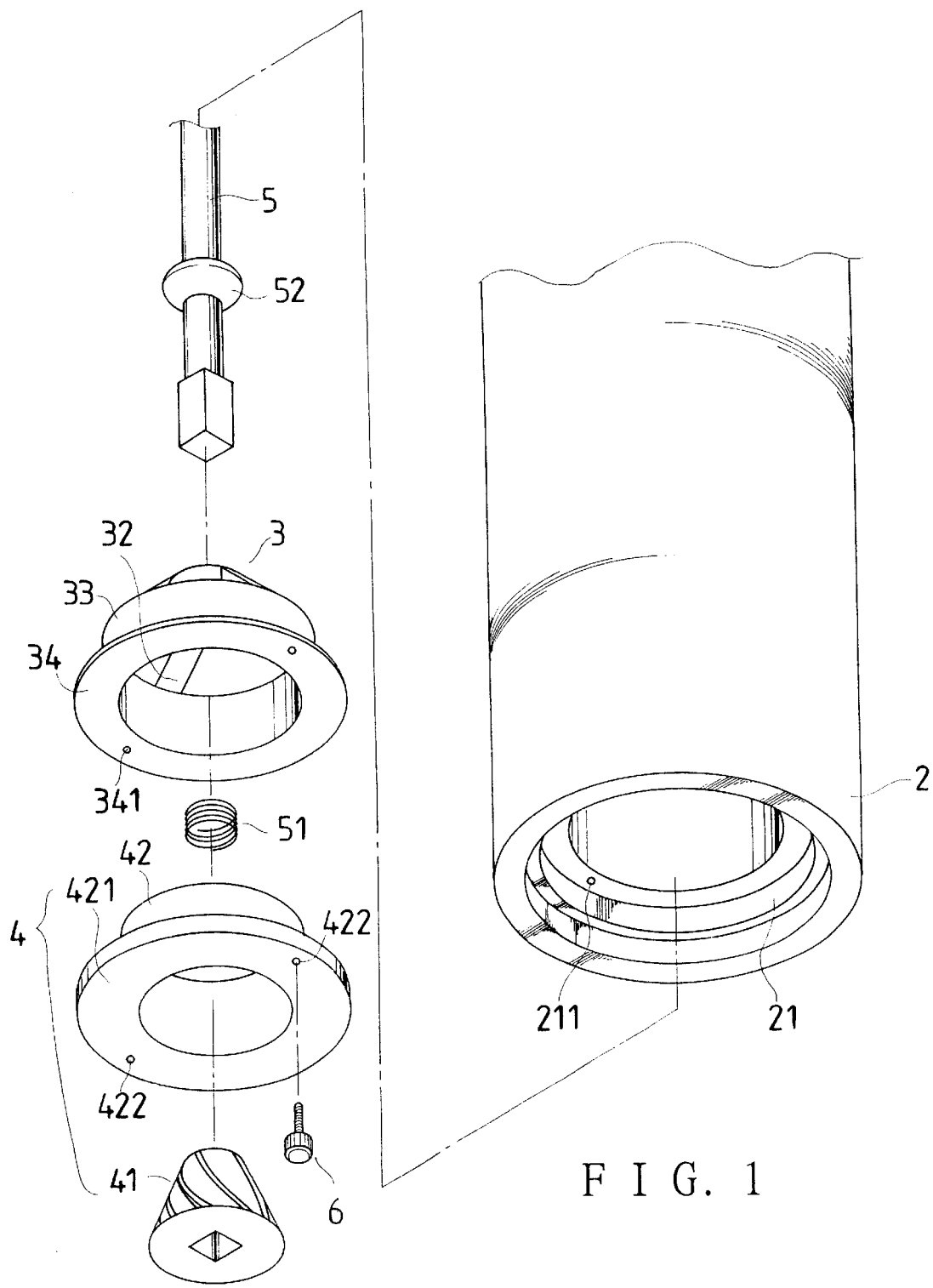
FIG. 1 is an exploded perspective view of a pepper grinding tool according to a first embodiment of the present invention.
Figure 2:
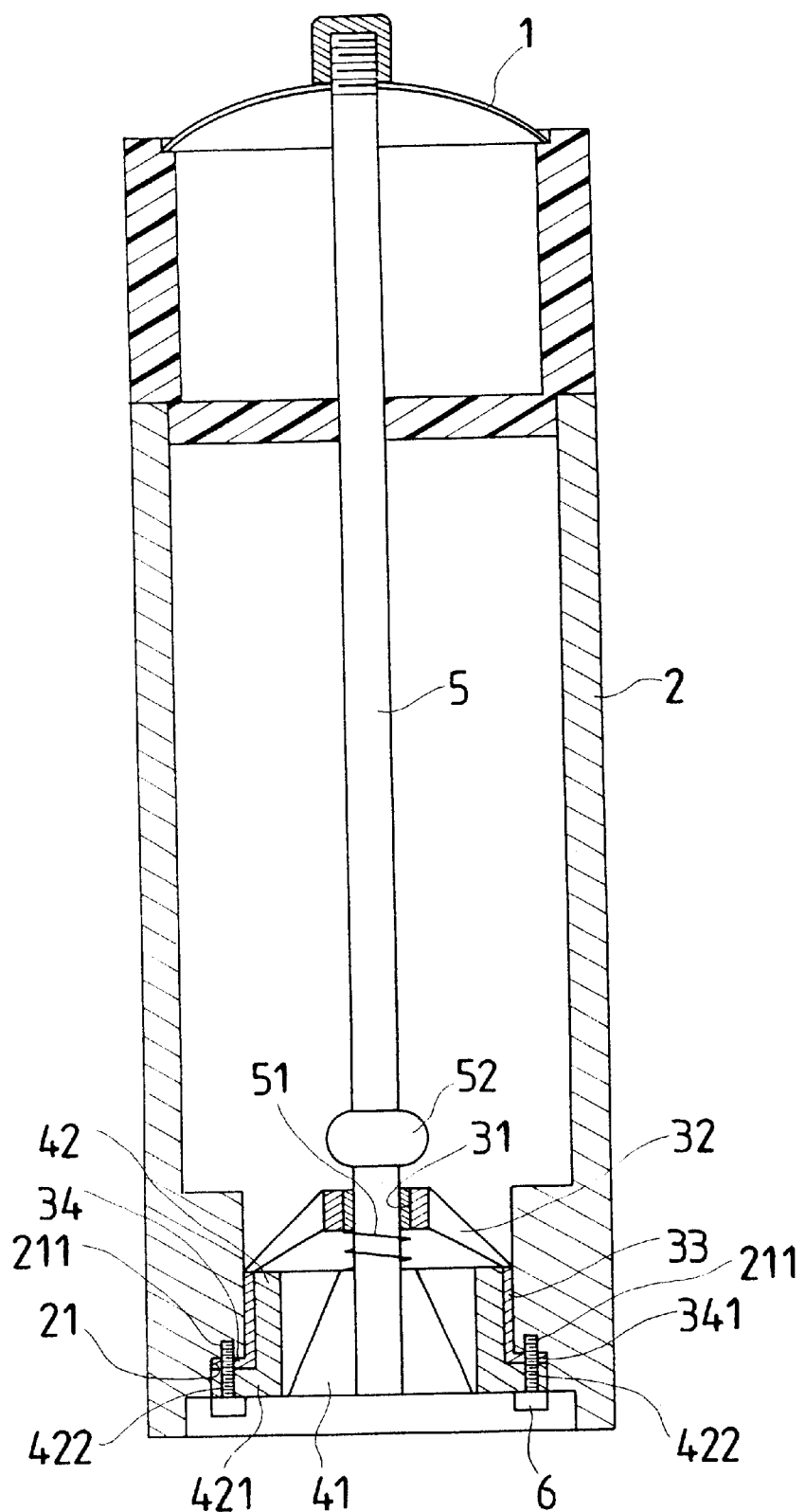
FIG. 2 is a cross-sectional view of the pepper grinding tool in FIG. 1.
Figure 3:
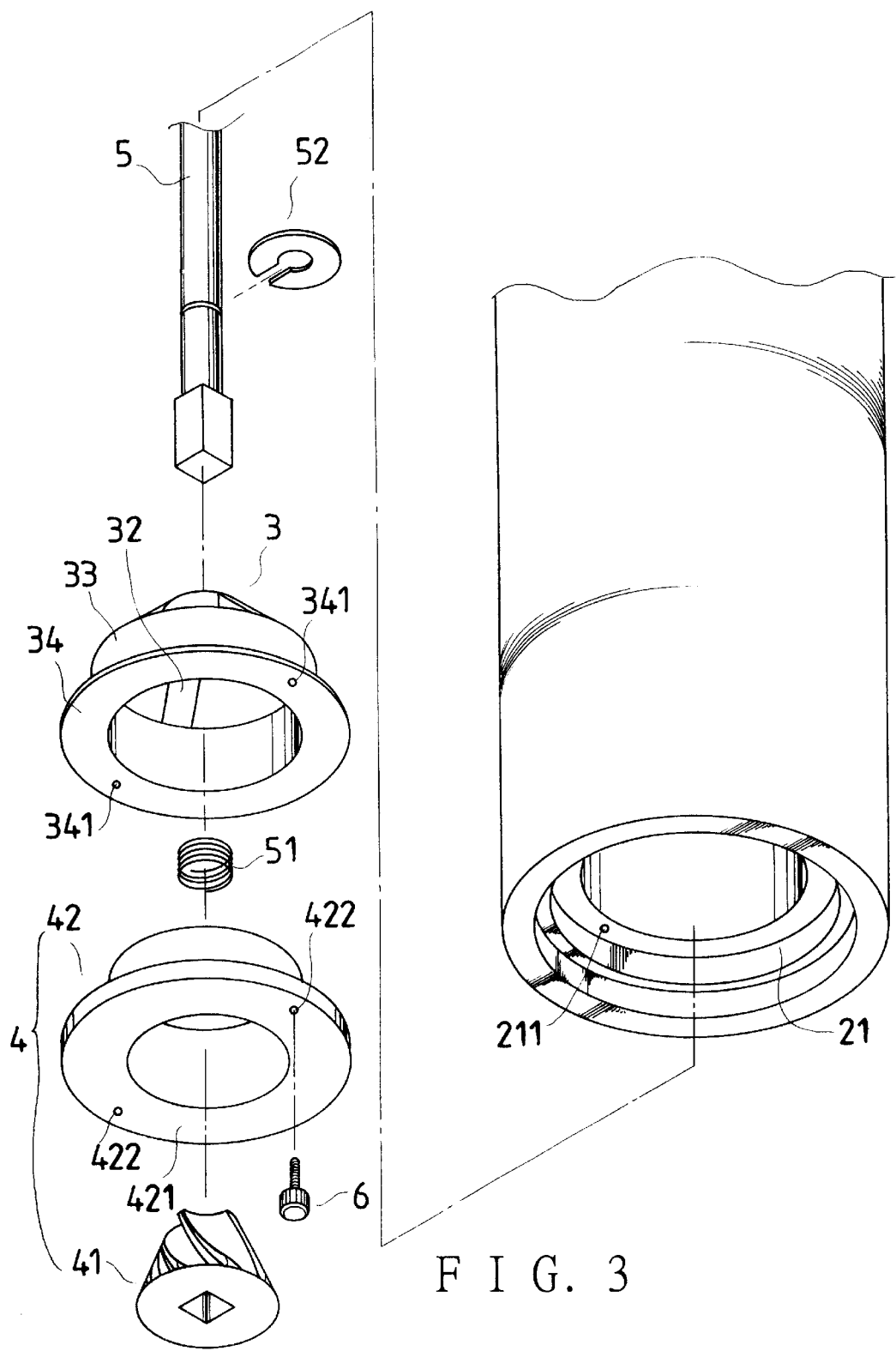
FIG. 3 is an exploded perspective view of a pepper grinding tool according to a second embodiment of the present invention.
Figure 5:
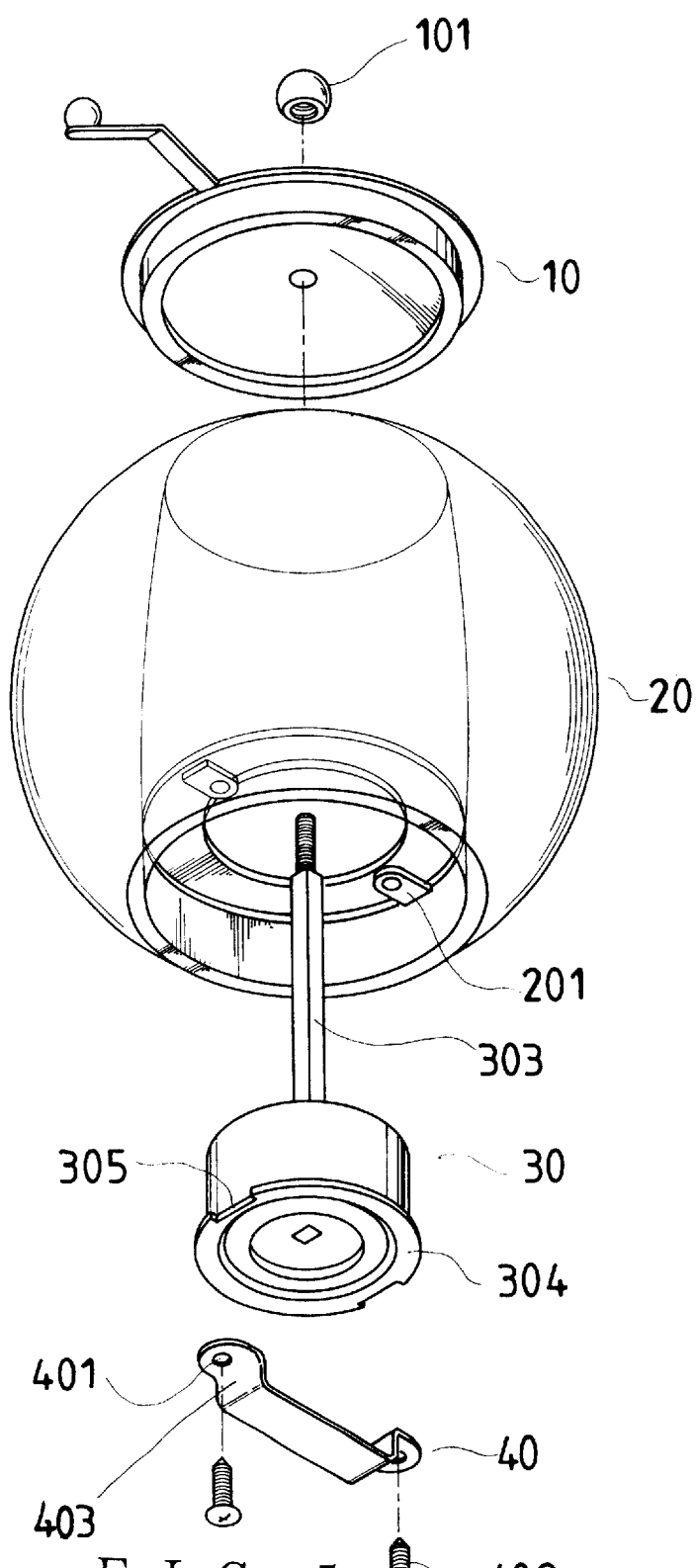
FIG. 5 is an exploded perspective view of the prior art pepper grinding ol as describe in the Background.
Figure 6:
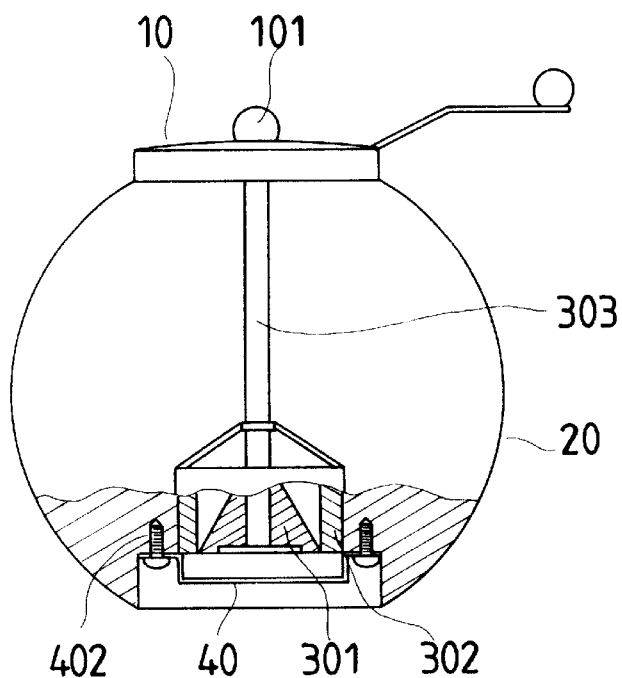
FIG. 6 is a cross-sectional view of the pepper grinding tool in FIG. 5.
Figure 7:
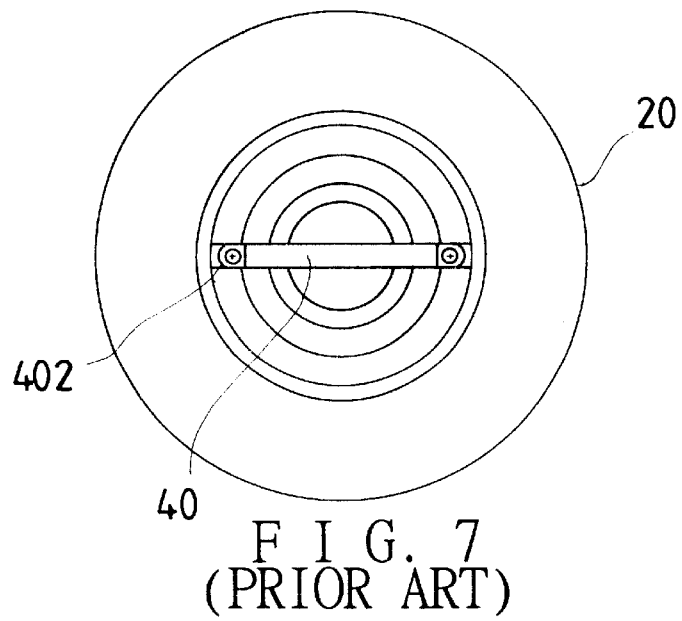
FIG. 7 is a bottom view of the pepper grinding tool in FIG. 5.

Referring to FIGS. 1 and 2, a pepper grinding tool of the present invention comprises an upper cover 1, a main body 2, a socket 3, a grinding member 4 and a transmission shaft 5.

The main body 2 has a holding chamber (not numbered) therein, and an annular recess 21 on an inner side. Screw holes 211 are provided on a topside of the annular recess 21.

The socket 3 has several support legs 32 protruding from an annular wall 33 thereof, the support legs 32 connect each other at upper ends, and have a common central hole 31 on a top end formed the upper thereof. A rim 34 is provided on a lower part of the socket 3 connected to the annular wall 33. The rim 34 has through holes 341 thereon.

The grinding member 4 consists of an inner grinding part 41 and an outer grinding part 42. Pepper can be ground into small particulate between the grinding parts 41 and 42. The outer grinding part 42 has a holding room (not numbered) therein for permitting the inner grinding part 41 to be received therein. The outer grinding part 42 further has a rim 421 on a lower side thereof, through holes 422 are provided on the rim 421.

The transmission shaft 5 is passed through the central hole 31 of the socket 3 and the outer grinding part 42, and finally connected to the inner grinding part 41 from a lower end portion. The transmission shaft 5 further has a stopping protrusion 52. In a first embodiment of the present invention, the stopping protrusion 52 is a ring fastened to the shaft 5. In a second embodiment of the present invention, the stopping protrusion 52 is an annular block projecting from the shaft 5.

In combination, the socket 3 is received in and connected to the main body 2 with the rim 34 fitted into the annular recess 21. The grinding member 4 is received in the socket 3. A spring 51 is located between the inner and the outer grinding parts 41 and 42 in order for the inner grinding part 41 to be located at a proper position. Screws 6 are screwed into the through holes 422 of the rim 421, the through holes 341 of the rim 34 and the screw holes 211 of the main body 2 in sequence in order to secure the grinding member 4 and the socket 3 to the main body 2. The stopping protrusion 52 of the transmission shaft 5 is arranged above the socket 3 for preventing the shaft 5 from moving further down. The shaft 5 is connected to the upper cover 1 from an upper end thereof.

Thus, the inner grinding part 41 can be turned manually to grind pepper into small particulate between the inner and the outer grinding parts 41 and 42. The pepper particulate can fall out of the grinding tool from a bottom of the grinding member 4 very easily and completely because therein is no fixing plate under the grinding member 4.

From the above description, the pepper grinding tool can be seen to have an advantage over the prior art one as described in the Background. There will be no residues of ground pepper particulate on the grinding tool after use. And, the pepper particulate can be dispensed very easily without having to shake the pepper grinding tool.

What is claimed is:

1. A pepper grinding tool, comprising:
   (a) a main body, said main body having a holding chamber formed therein and an annular recess formed on an inner side thereof;
   (b) a socket, said socket having an annular wall surrounding a central opening and a first rim connected to a lower end portion of said annular wall, said first rim having a plurality of through holes formed therein, said socket being received in said holding chamber of said main body with said first rim fitted into said annular recess of said main body;
   (c) a grinding member disposed in said central opening of said socket and consisting of:
     (1) an outer grinding part having a holding room formed therein and a second rim formed on a lower end portion of said outer grinding part, said second rim having a plurality of through holes formed therein, said outer grinding part being received in said central opening of said socket with said second rim thereof arranged under said first rim of said socket with said plurality of through holes in said second rim being respectively aligned with said plurality of through holes of said first rim and a plurality of screws being respectively passed through said plurality of aligned through holes of said first and second rims into said main body to secure said outer grinding part and said socket to said main body, and
     (2) an inner grinding part rotatably disposed in said holding room of said outer grinding part for permitting pepper to be ground between said inner grinding part and said outer grinding part; and,
   (d) a transmission shaft passed through said socket and said outer grinding part, and having one end connected to said inner grinding part, said shaft having another end passed through a cover of said main body, said shaft having a stopping protrusion disposed above said socket for limiting downward passage of said shaft; whereby pepper is ground into small particulates between said inner and said outer grinding parts, and dispensed from a bottom side of said grinding member.

2. The pepper grinding tool as claimed in claim 1, wherein said stopping protrusion is a ring fastened to said transmission shaft.

3. The pepper grinding tool as claimed in claim 1, wherein said stopping protrusion is an annular block protruding from said transmission shaft.

* * * * *